United States Patent
Price et al.

(10) Patent No.: US 9,851,478 B2
(45) Date of Patent: Dec. 26, 2017

(54) OPTICAL CROSS TALK MITIGATION FOR OPTICAL DEVICE HAVING DISRUPTING FEATURES FORMED ON A SHIELD

(71) Applicant: MICROSOFT TECHNOLOGY LICENSING, LLC, Redmond, WA (US)

(72) Inventors: Raymond Kirk Price, Redmond, WA (US); Erica Lee Towle, Lynnwood, WA (US); Ravi Kiran Nalla, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 92 days.

(21) Appl. No.: 15/040,872

(22) Filed: Feb. 10, 2016

(65) Prior Publication Data
US 2017/0227686 A1   Aug. 10, 2017

(51) Int. Cl.
*H01L 27/146* (2006.01)
*G02B 5/00* (2006.01)
*G02B 27/01* (2006.01)

(52) U.S. Cl.
CPC ......... *G02B 5/003* (2013.01); *G02B 27/0172* (2013.01); *G02B 2027/0138* (2013.01); *G02B 2027/0178* (2013.01)

(58) Field of Classification Search
CPC ......... H01L 27/14623; H01L 31/02164; H01L 27/14636; H01L 29/78633; G02B 27/0172; G02B 5/003
USPC ............................................ 250/216, 227.11
See application file for complete search history.

(56) References Cited

U.S. PATENT DOCUMENTS 6,740,862 B2 * 5/2004 Paritsky ............... H04R 23/008
                                                    250/216
8,139,145 B2    3/2012 Ryu et al.
8,304,707 B2   11/2012 Lee et al.
8,337,620 B2   12/2012 Pei
8,416,514 B2    4/2013 Kim et al.
(Continued)

FOREIGN PATENT DOCUMENTS

CN        201203742 Y      3/2009
CN        101699344 A      4/2010
(Continued)

OTHER PUBLICATIONS

Naik, et al., "A Light Transport Model for Mitigating Multipath Interference in Time-of-flight Sensors", In Proceedings of the IEEE Conference on Computer Vision and Pattern Recognition, Jun. 2015, 9 pages.
(Continued)

*Primary Examiner* — Que T Le
(74) *Attorney, Agent, or Firm* — Newport IP, LLC; Jacob P. Rohwer

(57) ABSTRACT

A system and method are disclosed for reducing light from one or more light sources from entering into a light sensor by reflection off of a visor and/or waveguiding within the visor. In embodiments, a shroud may be provided around the light sensor to block light reflected off of the visor from entering the light sensor. In embodiments, pattern of one or more grooves may be formed in the visor to block light waveguided within the visor from entering the light sensor.

20 Claims, 9 Drawing Sheets

(56) References Cited

U.S. PATENT DOCUMENTS

| | | |
|---|---|---|
| 2007/0126912 A1 | 6/2007 | De Bruin et al. |
| 2013/0286282 A1 | 10/2013 | Yamamoto |
| 2014/0313404 A1 | 10/2014 | Miao |
| 2015/0195437 A1 | 7/2015 | Barringer |
| 2015/0260988 A1 | 9/2015 | Sugihara et al. |
| 2015/0277000 A1 | 10/2015 | Lee |

FOREIGN PATENT DOCUMENTS

| | | |
|---|---|---|
| JP | H0821974 A | 1/1996 |
| WO | 2009137022 A1 | 11/2009 |
| WO | 2014188147 A1 | 11/2014 |

OTHER PUBLICATIONS

"International Search Report and Written Opinion Issued in PCT Application No. PCT/US2017/016309", dated Apr. 4, 2017, 12 Pages. (MS# 358862-WO-PCT).

\* cited by examiner

OPTICAL CROSS TALK MITIGATION FOR OPTICAL DEVICE HAVING DISRUPTING FEATURES FORMED ON A SHIELD

BACKGROUND

Head mounted display devices used for example in augmented reality environments often use active illuminated cameras for 3D sensing and ranging. Such cameras may employ one or more illumination assemblies for emitting pulsed light, and a light sensor for receiving the laser light reflected back from objects within the field of view of the camera. The distance to the objects within the field of view may then be determined, using for example time of flight or structured light methods. The one or more laser diodes and light sensor are encased behind a visor or other optical shield used for aesthetics and to protect the components of the head mounted display device including the one or more laser diodes and light sensor.

A problem with conventional head mounted display device designs is that light from the one or more illumination assemblies may be disrupted by the visor and coupled to the light sensor, thereby distorting depth camera measurements. This may happen two ways. First, some portion of the light from a laser diode may be reflected by the visor directly back into the light sensor according to Fresnel's Equations. Second, contaminants on one or both surfaces of the visor, or imperfections in the surface coatings of the visor may cause some portion of the light from a laser diode to couple into the visor. This phenomenon, referred to herein as waveguiding, transmits the light from the laser diode through the visor and into the light sensor.

SUMMARY

Embodiments of the present technology relate to a system and method for reducing light from one or more light sources from entering into a light sensor by reflection off of a visor and/or waveguiding within the visor. In embodiments, the system may be incorporated into a device, such as a head mounted display device, including an imaging device mounted behind a visor. The imaging device may be an IR depth sensor including one or more light sources and a light sensor which together operate to sense the depth of objects within the field of view of the depth sensor.

In one embodiment, the system includes a shroud mounted around the light sensor of the camera. The shroud may be optically opaque to the wavelengths of light emitted by the one or more light sources. Thus, the shroud may block scattered light rays from the one or more light sources reflecting off of the visor and the secondary reflections from the mechanical assembly which may otherwise enter the light sensor. The shroud may be affixed to the visor by a gasket, which is itself optically opaque to the wavelengths of light emitted by the one or more light sources. The gasket further blocks light rays from the one or more light sources from entering the light sensor by creating intimate contact between the shroud and the visor.

In a further embodiment, the system includes one or more features for disrupting waveguided light in the visor from reaching the light sensor. The waveguide obstructing features may for example be one or more grooves filled with a material that is optically opaque to the wavelengths of light emitted by the one or more light sources. Additionally and/or alternatively, a material that is optically opaque to the wavelengths of light emitted by the one or more light sources may be applied to a surface of the visor. The grooves and opaque material block light from the one or more light sources that may otherwise enter the light sensor via waveguiding.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present technology will now be described with reference to the figures, which in general relate to system including a compact camera mounted behind an optical shield such as a visor. The compact camera may for example be a depth camera including one or more light sources and a light sensor which together are capable of sensing distances to objects within the field of view of the camera. The system is configured to reduce or prevent light from the one or more light sources from being transmitted by the visor directly into the light sensor.

In one embodiment, the system includes a shroud mounted around the light sensor of the camera. The shroud may be optically opaque to the wavelengths of light emitted by the one or more light sources, and is designed to block stray light from the active illuminators from entering into the optical sensor. The visor may have a different index of refraction than the air on either side of the visor, but is designed to have very low reflectivity at the wavelength band of interest.

The shroud according to the present technology may block light from the one or more light sources reflecting off of the visor which may otherwise enter the light sensor. The shroud may be affixed to the visor by a gasket, which is itself optically opaque to the wavelengths of light emitted by the one or more light sources. The gasket further blocks reflected light from the one or more light sources from entering the light sensor. The gasket may have an index of refraction that is matched to, or greater than, the index of the visor, so that light that is waveguiding in the visor may be coupled out of the visor and absorbed by the shroud.

In a further embodiment, the system includes one or more features for disrupting light, waveguided within the visor, from reaching the light sensor. These features, referred to herein as optical disrupting features, may be implemented in a variety of ways. In one example, the optical disrupting features may be implemented as grooves formed into one or more layers of the visor. The one or more grooves may be filled with a material that is optically opaque to the wavelengths of light emitted by the one or more light sources. Additionally and/or alternatively, the optical disrupting features may be implemented as a material that is optically opaque to the wavelengths of light emitted by the one or more light sources which is applied to a surface of the visor.

Contamination such as finger prints and/or impurities in one or more surfaces of the visor may allow light to get trapped within the visor and transmitted through the visor by waveguiding. The optical disrupting features block waveguided light from the one or more light sources that may otherwise enter the light sensor.

Figure 1:
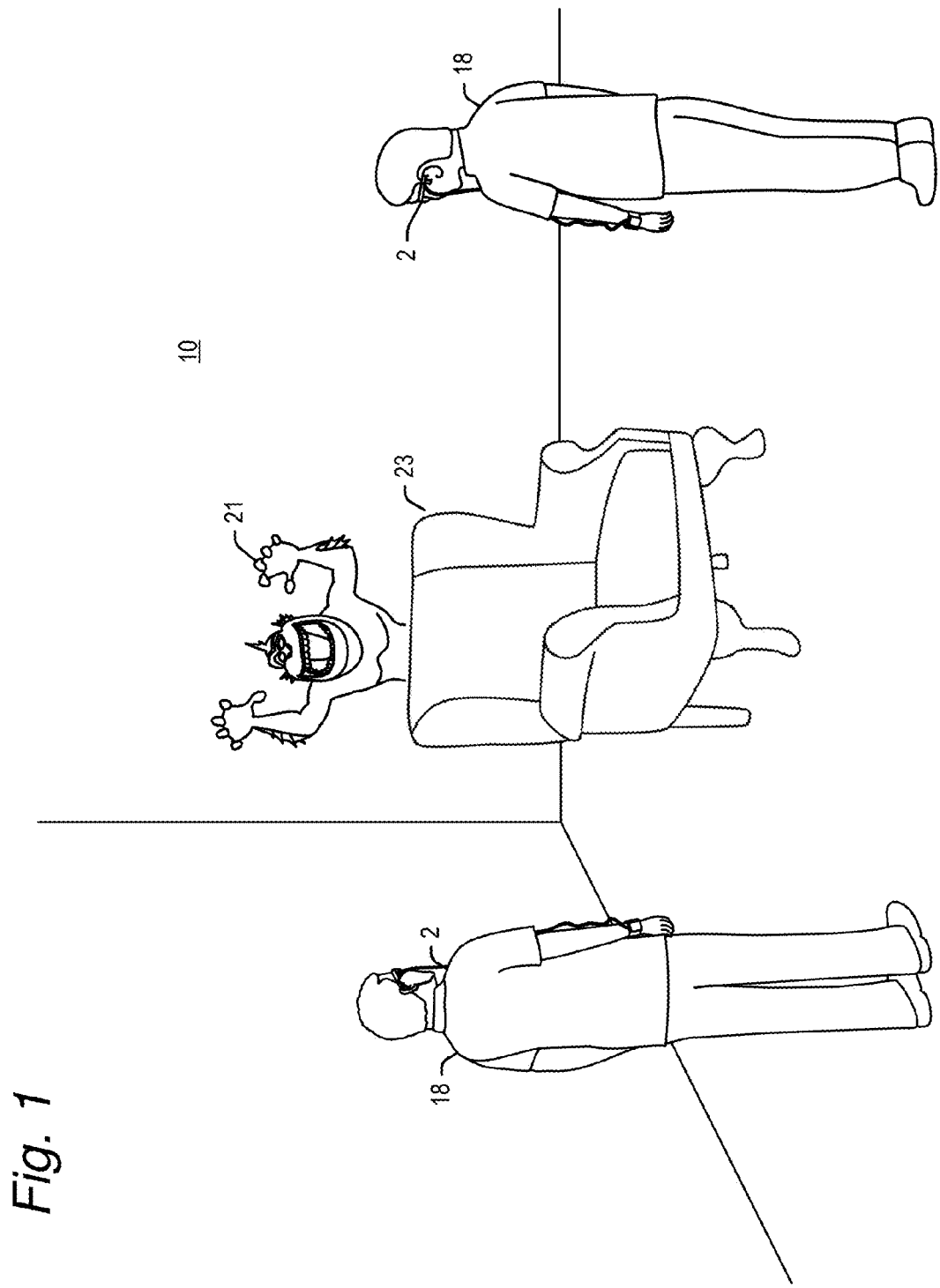
FIG. 1 is an illustration of a virtual reality environment including real and virtual objects.

In one embodiment explained below, the shroud, gasket, grooves and/or opaque material according to the present technology may be used in a depth sensor of a head mounted display device for presenting an augmented reality experience. FIG. 1 illustrates an augmented reality environment 10 for providing an augmented reality experience to users by fusing virtual content 21 with real content 23 within each user's FOV. FIG. 1 shows users 18 wearing a head mounted display device 2 for presenting the augmented reality experience to the users.

However, it is understood that the shroud, gasket, grooves and/or opaque material according to the present technology may be used in a wide variety of imaging devices other than those used in a head mounted display, and a wide variety of cameras other than a depth camera. The shroud, gasket, grooves and/or opaque material of the present technology may be used in a wide variety of other devices including one or more light source and a light sensor mounted adjacent to a shield that is at least partially optically transparent to the wavelengths of light emitted by the one or more light sources. The present technology may be used in any of various devices where the one or more light sources are in proximity to the light sensor, such that (without the present technology) light from one or more of the light sources may be transmitted into the light sensor via the shield.

Figure 2:
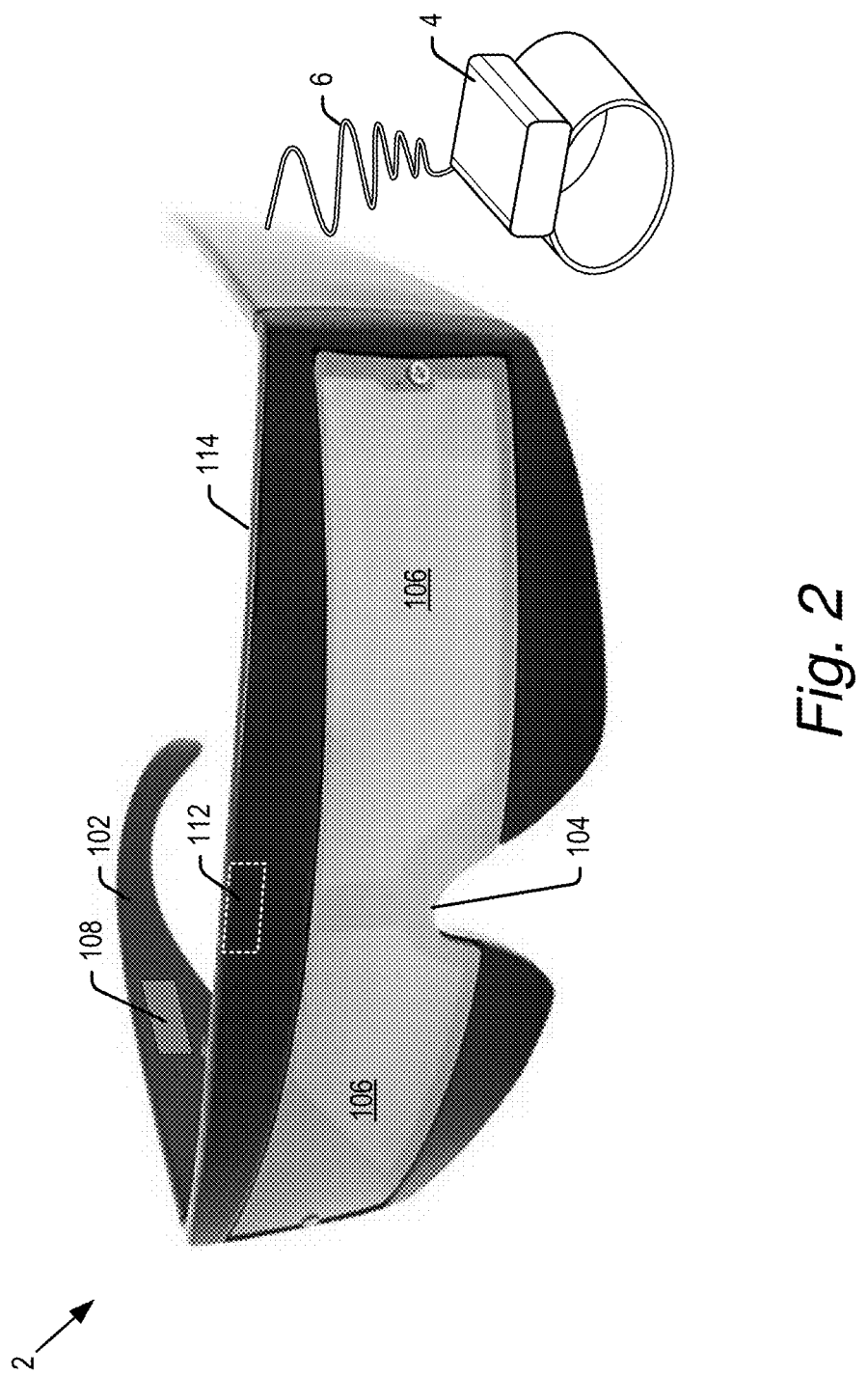
FIG. 2 is a perspective view of one embodiment of a head mounted display unit.

As shown in FIG. 2, a head mounted display device 2 may include glasses frame 102 and a nose bridge 104 so that the head mounted display device 2 may be worn comfortably on a user's head. The device 2 may further include optical assemblies 106 including lenses and optical wave guides for presenting real and virtual objects to the eyes of a wearer. Control circuits 108 may be mounted in the frame 102 to provide various electronics that support the components of head mounted display device 2. The head mounted display device 2 may include or be in communication with its own processing unit 4, for example via a flexible wire 6.

The head mounted display device may further include a room facing imaging device 112 behind a visor 114. The imaging device including aspects of the present technology may be used with shields other than a visor 114, such as for example shields that are not head-worn.

The room facing imaging device 112 may be a depth sensor including one or more light sources and a light sensor as explained below. The one or more light sources and/or light sensor may be positioned adjacent the visor 114. In embodiments, being adjacent means that the one or more light sources and/or light sensor are behind the visor (when worn by a user) and directly affixed to a surface of the visor 114. In further embodiments, being adjacent means that the one or more light sources and/or light sensor are slightly spaced from a surface of the visor 114. Slightly spaced may include being spaced from the visor by up to 2 mm, but slightly spaced may include spacings that are larger than 2 mm in further embodiments. The visor 114 may be opaque (at portions) to wavelengths in the visible spectrum, but transparent (at least to a degree) for wavelengths emitted by the one or more light sources.

Additional components of the head mounted display device used to generate an augmented reality experience but not directly related to the optical cross talk mitigation of the present technology are omitted. However, such additional components are described for example in U.S. Patent Publication No. 2013/0326364 entitled "Position Relative Hologram Interactions," published on Dec. 5, 2013.

Figure 3:
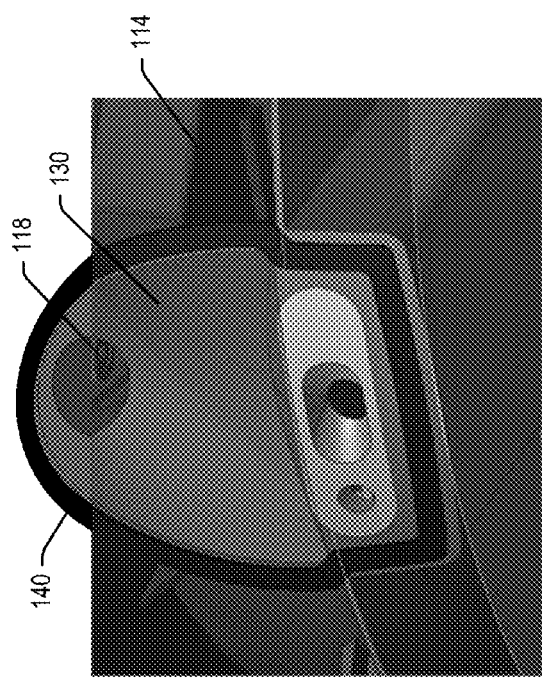
FIG. 3 is a perspective view of a light sensor and shroud according to a first embodiment of the present technology.
Figure 4:
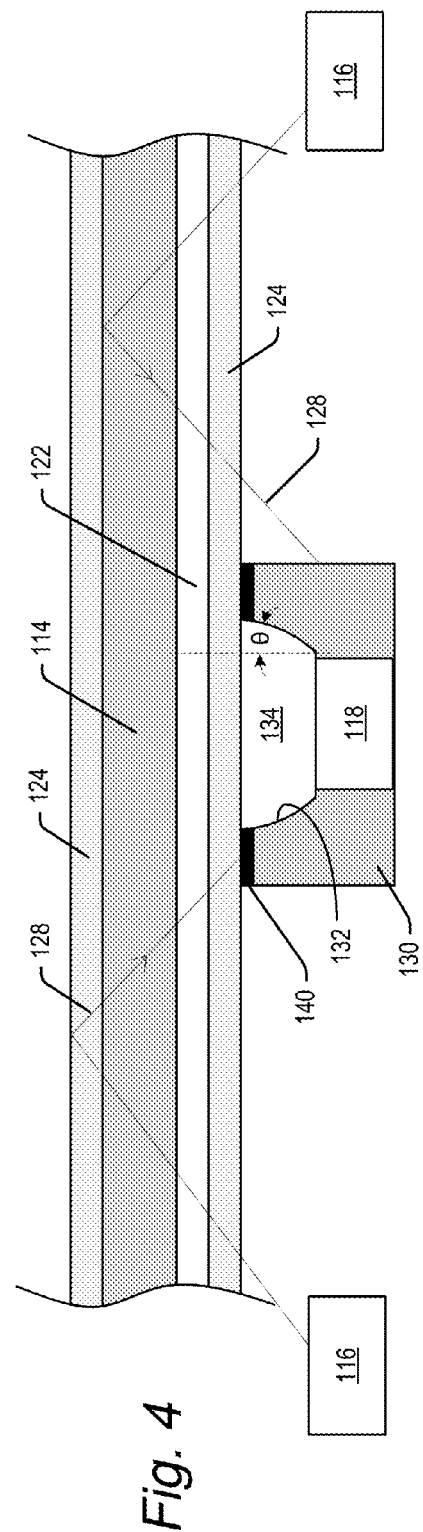
FIG. 4 is a top cross-sectional view of a light sensor and shroud according to a first embodiment of the present technology.

FIGS. 3 and 4 are perspective and cross-sectional top views of imaging device 112 and visor 114 illustrating aspects of an embodiment of the present technology. As seen in FIG. 4, the imaging device 112 comprises one or more light sources 116 (two of which are shown schematically in FIG. 4) and a light sensor 118. The light sources 116 may be semiconductor devices such as for example laser diodes emitting for example light in the IR wavelengths. Other types light sources are contemplated. The light sensor 118 may be configured to capture a depth image of an area in the field of view of the sensor 118. The depth image may include a two-dimensional (2-D) pixel array of the captured area where each pixel in the 2-D pixel array may represent a distance of an object in the captured area from the depth sensor 118. The depth image may capture depth values of the area via any suitable technique including, for example, time-of-flight, structured light, stereo image, or the like. According to one embodiment, the depth sensor 118 may organize the calculated depth information into "Z layers," or layers that may be perpendicular to a Z axis extending from the depth sensor along its line of sight.

The visor 114 may for example be formed of injection-molded polycarbonate, though it may be formed of other plastics or glass in further embodiments. As seen in FIG. 4, the visor may be coated with the dye 122 which is opaque to light in the visible wavelength but (at least partially) transparent to light in the wavelengths of the one or more light sources 116. An anti-reflective coating 124 may be applied to the exposed surface of the visor 114 and/or over the dye layer 122. It is understood that one or more of the coated layers 122, 124 may be omitted in further embodiments, and the visor 114 may have additional or alternative coatings in further embodiments.

As noted above, instead of passing through the visor 114 and coatings 122, 124, a portion of light (128) from the one or more light sources 116 may reflect off of surfaces of one or more of the visor 114 and/or coatings 122, 124 formed thereon, toward the light sensor 118. If the reflected light 128 were to enter the light sensor 118, this would impair the sensor 118 readings and distort measured depth values. Therefore, in accordance with a first aspect of the present technology, a shroud 130 may be formed around the aperture of the light sensor 118. The shroud may be formed of polycarbonate or other plastic or glass, and have optical filtering properties such that it blocks light at the wavelengths emitted by the one or more light sources 116. It may block other wavelengths of light in further embodiments.

Thus, light (128) from the one or more light sources 116 that is reflected from a surface of the visor 114, or a surface of one of the coatings 122, 124, may be blocked by the shroud 130 and prevented from reaching the light sensor 118. The shroud 130 may include angled sidewalls 132 adjacent the light sensor 118 to define an aperture 134 above the light sensor 118. The sidewalls may be curved or straight. In embodiments, the angle θ of the sidewalls may be selected so as to be large enough to encompass at least the field of view of the image sensor 118. Conversely, the angle θ of the sidewalls and be selected so as to be small enough to block reflected light from any of the surfaces of visor 114 and coatings 122, 124. In embodiments, the angle θ of the sidewalls may be 30°, but the angle θ may be larger or smaller than that in further embodiments.

The shroud 130 may be affixed to the visor 114, for example against one of the antireflective coatings 124. As shown in FIGS. 3 and 4, in order to prevent light from the one or more light sources 116 from reaching the light sensor 118 at the interface between the visor 114 and shroud 130, a gasket 140 may be provided at the interface between the visor 114 and shroud 130. The gasket 140 may have an index of refraction that is matched to, or greater than, the index of the visor 114, so that light that is waveguiding in the visor may be coupled out of the visor and absorbed by the shroud. The gasket 140 may completely encircle the shroud 130 and light sensor 118, and may be formed of a gasket material of low reflectivity to absorb/block any light that impinges upon it. The gasket 140 may also be provided with an adhesive on opposed surfaces so that the gasket 140 affixes the shroud 130 to the visor 114.

As noted above, instead of passing through the visor 114 and coatings 122, 124, a portion of light (128) from the one or more light sources 116 may couple within the visor 114, and travel through the visor 114 in a phenomena referred to herein as waveguiding. Some of this waveguided light may leave the visor 114 and enter the light sensor 118, thereby impairing the sensor 118 readings and distorting measured depth values. Therefore, in accordance with a second aspect of the present technology, a pattern of grooves may be formed in one or both surfaces of the visor 114 completely encircling the light sensor 118.

FIGS. 5 through 11 illustrate examples of optical disrupting features for preventing light waveguided within the visor 114 from reaching the light sensor 118. In general, the optical disrupting features may be one or more features which scatter the light through mechanical features in or on the visor 114, out-couple the light through anti-guiding (using for example high index materials), and/or absorb the light with optically absorbing materials. In examples explained below, the optical disrupting features may include grooves or abrasions in a surface of the visor and/or an optically opaque material within the grooves/abrasions or on a surface of the visor.

Figure 5:
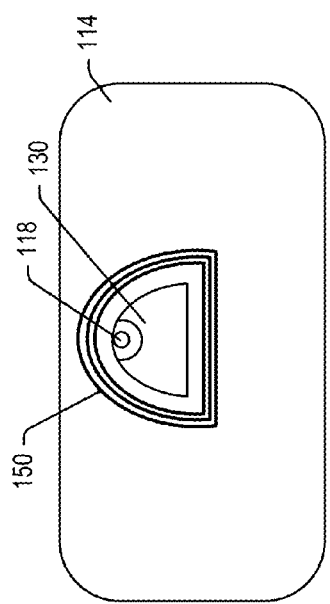
FIG. 5 is a front view of a light sensor and pattern of grooves according to a second embodiment of the present technology.

FIG. 5 shows a front view of a section of the visor 114 including optical disrupting features in the form of a pattern of grooves 150 in a surface of the visor 114 around the light sensor 118. In the embodiment shown, the grooves 150 are formed around a shroud 130 as described above. However, it is understood that the pattern of grooves 150 may be used without a shroud 130 in further embodiments. It is further understood that the shape of the pattern of grooves 150 may vary in further embodiments used with or without a shroud 130.

Figure 6:
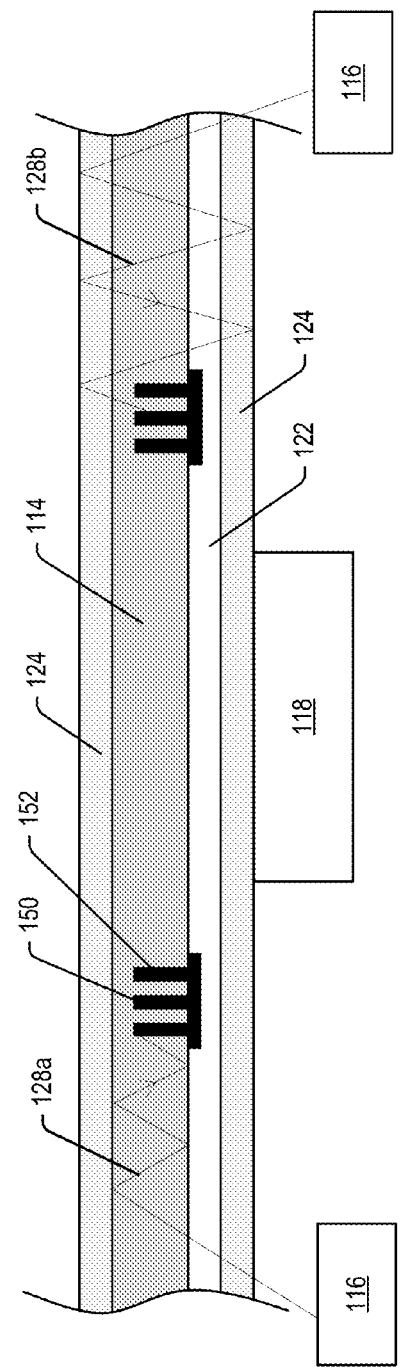
FIG. 6 is a top cross-sectional view of a light sensor and grooves according to a second embodiment of the present technology.

FIG. 6 shows a cross-sectional top view of a visor 114 including a pattern of grooves 150 as shown in FIG. 5. In the embodiment of FIGS. 5 and 6, a ring pattern of three separate grooves are formed partially through the thickness of the visor 114. It is understood that there may be one, two or greater than three grooves 150 in a pattern of grooves in further embodiments. The grooves may be formed from a side of the visor 114 including the light source 118. However, as explained below, the grooves 150 may be formed into either surface of visor 114 or both surfaces of visor 114 in further embodiments.

In embodiments, the visor 114 may have a thickness of 1.5 mm, and the grooves 150 may be formed to a depth of 25 microns (μm) to 300 μm, and further for example 200 μm, through the thickness of the visor 114. It is understood that the depth of the grooves 150 may be less than 100 μm or greater than 300 μm in further embodiments. The grooves 150 may have a width, transverse to their depth, of 200 μm to 500 μm and further for example 400 μm. It is understood that the width of the grooves 150 may be less than 200 μ greater than 500 μ in further embodiments.

The pattern of grooves 150 may for example be defined during the injection molding process in which the visor 114 is formed. For example, the mold defining the shape and dimensions of visor 114 may include raised walls in the shape and dimensions of the grooves 150. In further embodiments, the grooves 150 may be machined into the visor 114 after it is fabricated, for example by a water-jet cutting process. In a further embodiment, the grooves 150 may be formed using a laser.

After the grooves 150 are formed, they may be filled with a material 152 opaque to the wavelengths of the one or more light sources 116 and having a higher index of refraction than the material of visor 114. The opaque material 152 may for example be black paint or epoxy which is painted on or printed into the grooves 150. As shown in FIG. 6, the opaque material 152 may also be applied to an outer surface of the visor 114, for example before the dye layer 122 is applied.

Given the higher index of refraction of the material 152, waveguided light within the visor 114 striking the material 152 will be anti-guided (absorbed into) the opaque material 152, and prevented from reaching the light source 118. Light (128a) may be waveguided within the visor 114. In further embodiments, light (128b) may be waveguided within the visor 114 and one or more of the coatings 122, 124. The pattern of grooves 150 and material 152 are provided to absorb waveguided light in both instances as shown in FIG. 6. The number of grooves 150 and the spacing between grooves 150 may be selected based on the wavelength of light from the one or more light sources 116 so as to capture all waveguided light. In embodiments, the spacing between grooves 150 may be 100 μm to 500 μm and may for example be 200 μm. It is understood that the spacing between grooves 150 may be lesson 100 μm or greater than 500 μm in further embodiments.

Figure 7:
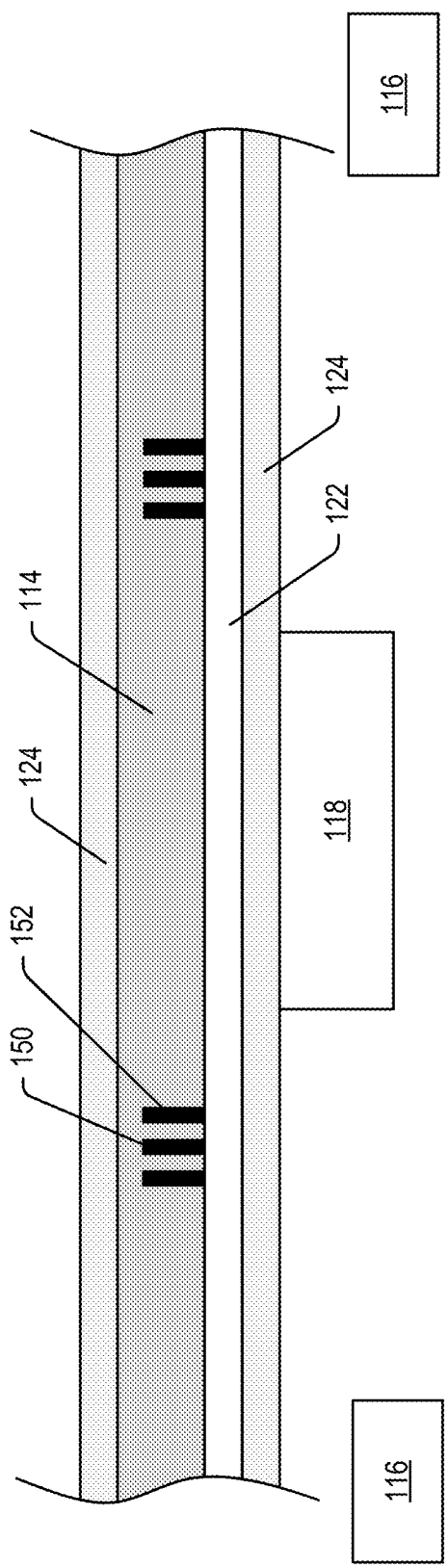
FIGS. 7-11 are top cross-sectional views of a light sensor and grooves according to further embodiments of the present technology.
Figure 8:
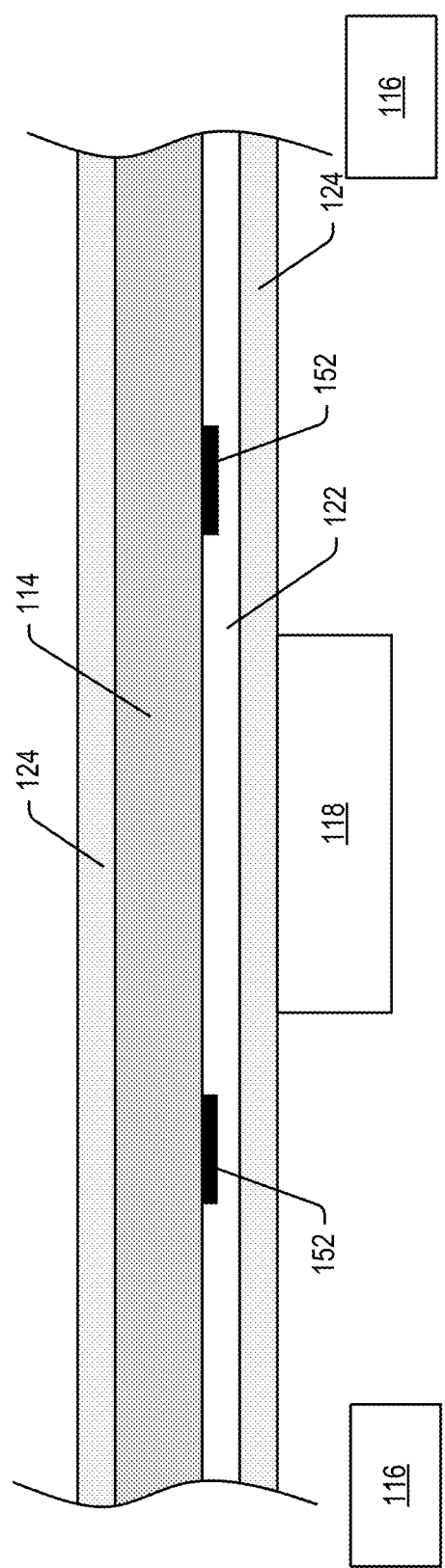

FIGS. 7-10 illustrate alternative optical disrupting features comprised of patterns of grooves 150 and/or applications of material 152 to a surface of the visor 114. The pattern of grooves 150 in the embodiment of FIG. 7 is similar to the embodiment of FIG. 6, except that the material 152 is provided only within the grooves 150 and not on a surface of the visor 114. The pattern of grooves 150 in the embodiment of FIG. 8 is similar to the embodiment of FIG. 6, except that the grooves 150 are omitted and the material 152 is provided in a ring pattern around the light sensor 118 only on a surface of the visor 114. The ring pattern of material 152 in this embodiment may be on the inside or outside surface of the visor 114 nearest the light sensor 118 and/or on the surface of the visor 114 farthest from the light sensor 118.

Figure 9:
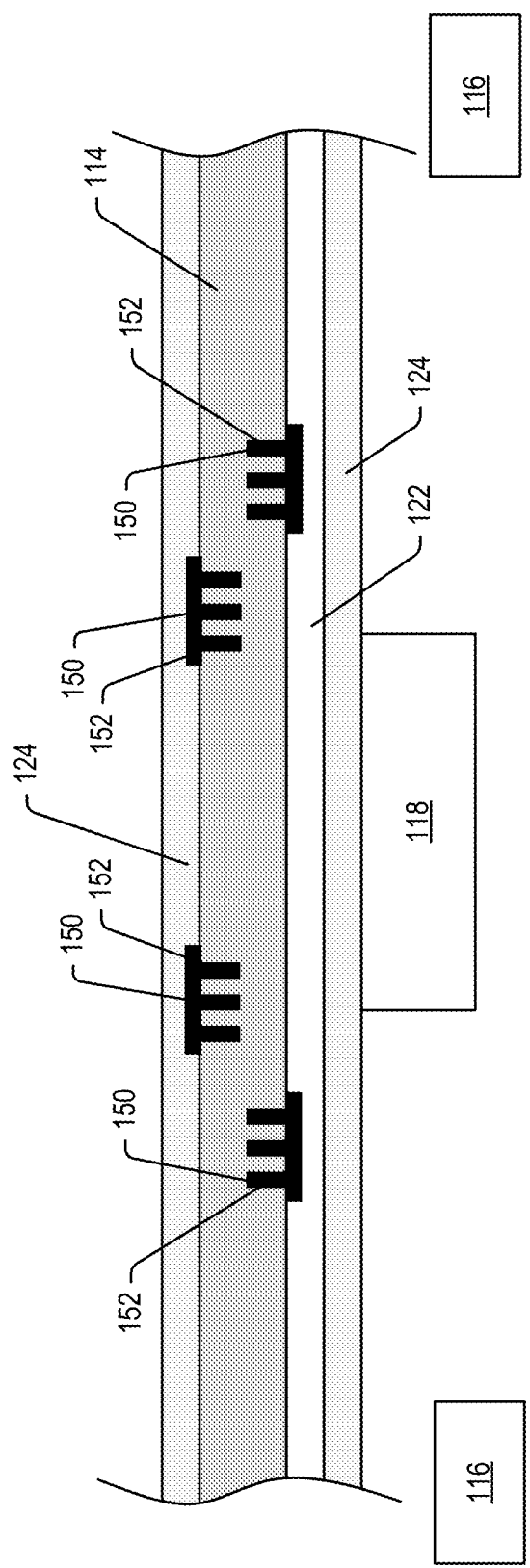
Figure 10:
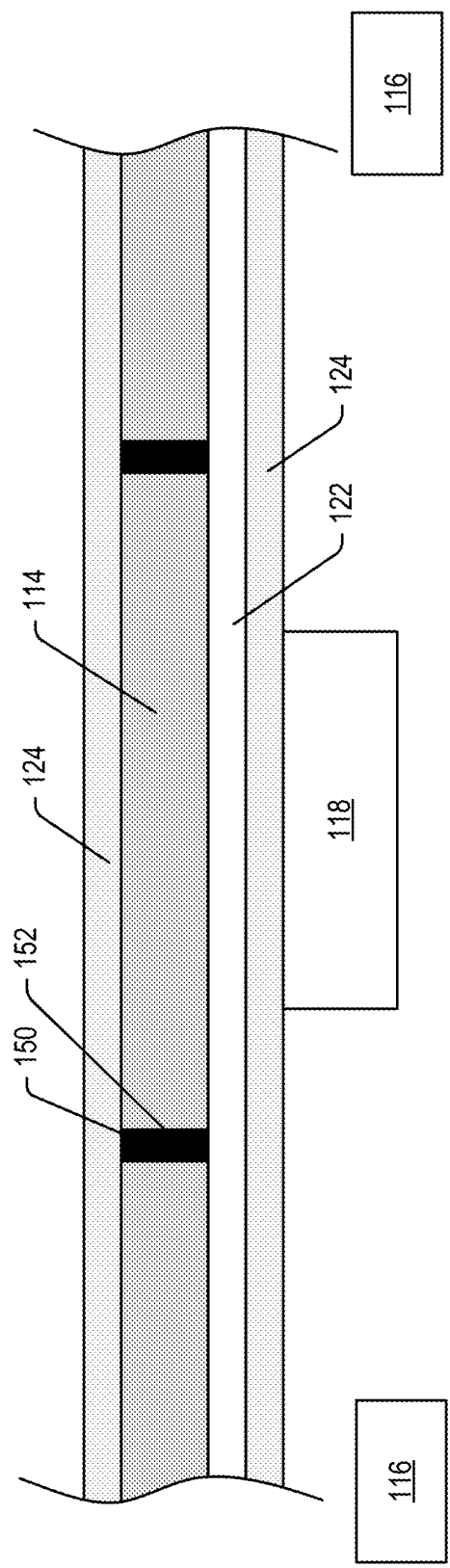

The pattern of grooves 150 in the embodiment of FIG. 9 is similar to the embodiment of FIG. 6, except that the grooves 150 and material 152 are provided in and on both surfaces of the visor 114. As noted above, the depth of the grooves 150 through the thickness of visor 114 may vary in embodiments. In the embodiment of FIG. 10, the grooves 150 are provided full thickness through the visor 114, i.e., the grooves 150 extend from one surface of the visor 114 to the opposed surface of the visor 114. The grooves 150 may then be filled with material 152 as described above.

In the embodiments of FIGS. 6-10 described above, the grooves 150 and material 152 are shown in and on the surfaces of visor 114. In further embodiments, the grooves 150 may additionally be provided through one or more of the layers 122, and the top and/or bottom layers 124. The material 152 may also additionally or alternatively be provided on one or more of the coated layers 122, 124.

Figure 11:
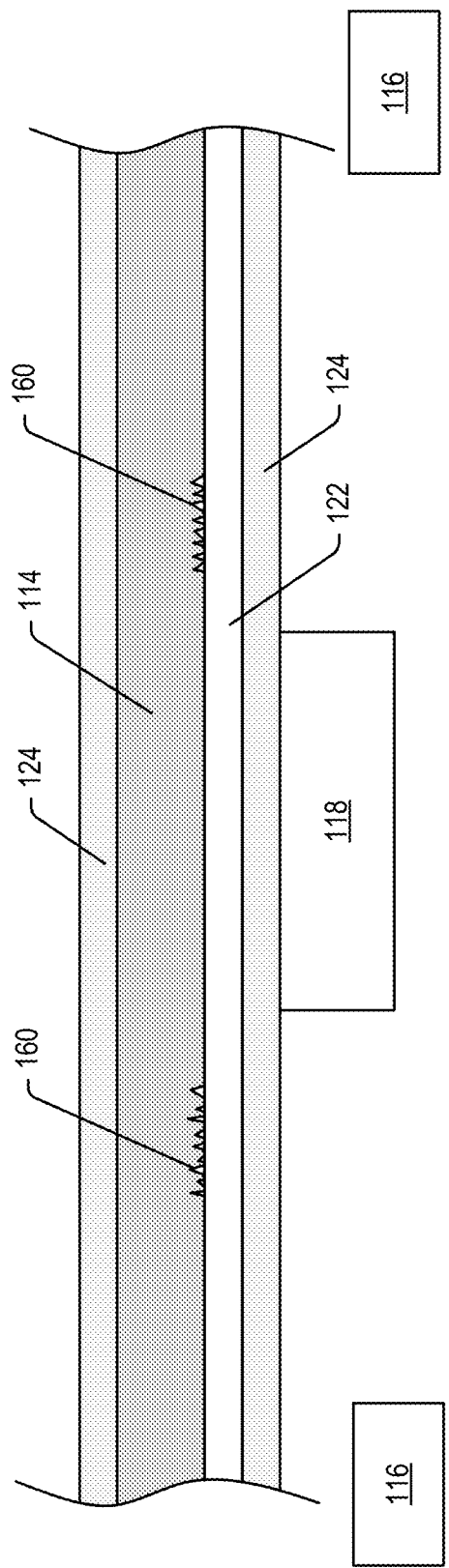

FIG. 11 illustrates a further embodiment for preventing waveguided light within the visor 114 from reaching the light sensor 118. In the embodiment of FIG. 11, instead of grooves 150 or material 152, one or both surfaces of the visor 114 may be abraded or roughened to create a ring pattern of abrasions 160 around the light sensor 118. The ring pattern of abrasions 160 disrupt the internal reflection of waveguided light within the visor 114 and prevents or reduces the amount of waveguided light that may enter the light sensor 118. The roughened pattern of abrasions 160 may be used with any of the embodiments described above. Additionally, the roughened pattern of abrasions 160 may alternatively or additionally be provided on one or more of the coated layers 122, 124.

While some examples of optical disrupting features such as grooves, abrasions and optically opaque materials have been described, it is understood that other optical disrupting features may be provided which prevent light, waveguided within the visor, from reaching the light sensor. Other patterned structures may be formed on or in a surface of visor 114, other mechanical features may be molded or stamped into or on the visor 114, and other dielectric or other materials may be used for anti-guiding the waveguided light to prevent it from reaching the light sensor 118.

Embodiments described above may be effective at providing at least 20 decibels of isolation with regard to the amount light from the one or more light sources 116 that is reflected or waveguided directly into the light sensor 118.

In summary, in one example, the present technology relates to a system for reducing an amount of light transmitted from a light source of an imaging device to a light sensor of the imaging device by a shield, the light sensor being adjacent to the shield, the system comprising: optical disrupting features formed in or on a surface of the shield; and material, opaque to wavelengths emitted by the light source, used in conjunction with the optical disrupting features, the optical disrupting features and opaque material blocking light from the light source from entering the light sensor via waveguiding through the shield.

In another example, the present technology relates to a system for reducing an amount of light transmitted from a light source of an imaging device to a light sensor of the imaging device by a visor, the light source and light sensor being adjacent to the visor, the system comprising: a pattern of one or more grooves formed in a first area of the visor into a surface of the visor; and material, opaque to wavelengths emitted by the light source, the material at least partially filling the pattern of one or more grooves, and the material applied to a second area of the visor on the surface of the visor, the pattern of one or more grooves and opaque material blocking light from the light source from entering the light sensor via waveguiding through the visor.

In a further example, the present technology relates to a method of forming an imaging device for a head mounted display device, the head mounted display device comprising a visor, and the display device comprising a light source and light sensor positioned behind the visor when worn by a user, the method comprising: (a) forming optical disrupting features on or in a surface of the visor at least partially encircling an area of the visor adjacent to the light sensor; and (b) applying a material, opaque to wavelengths emitted by the light source, to the optical disrupting features, the optical disrupting features and opaque material blocking light from the light source from entering the light sensor via waveguiding through the visor.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A system for reducing an amount of light transmitted from a light source of an imaging device to a light sensor of the imaging device by a shield, the light sensor being adjacent to the shield, the system comprising:
    optical disrupting features formed in or on a surface of the shield; and
    material, opaque to wavelengths emitted by the light source, used in conjunction with the optical disrupting features, the optical disrupting features and opaque material blocking light from the light source from entering the light sensor via waveguiding through the shield.

2. The system of claim 1, further comprising a shroud around the light sensor, the shroud being opaque to wavelengths emitted by the light source, the shroud preventing light from the light source from being transmitted to the light sensor by reflection off of the shield.

3. The system of claim 1, wherein the optical disrupting features comprise a pattern of one or more grooves in a surface of the shield.

4. The system of claim 3, wherein the surface of the shield in which the grooves are formed is a surface of the shield in which the light source is adjacent.

5. The system of claim 1, wherein the optical disrupting features are formed partially through a thickness of the shield.

6. The system of claim 1, wherein the optical disrupting features are formed completely through a thickness of the shield.

7. The system of claim 1, wherein the material is black, optically opaque paint.

8. The system of claim 1, wherein the material has a higher index of refraction than the shield.

9. The system of claim 1, wherein the optical disrupting features encircle an area on the surface of the shield to which the light sensor is adjacent.

10. A system for reducing an amount of light transmitted from a light source of an imaging device to a light sensor of the imaging device by a visor, the light source and light sensor being adjacent to the visor, the system comprising:
    a pattern of one or more grooves formed in a first area of the visor into a surface of the visor; and
    material, opaque to wavelengths emitted by the light source, the material at least partially filling the pattern of one or more grooves, and the material applied to a second area of the visor on the surface of the visor, the pattern of one or more grooves and opaque material blocking light from the light source from entering the light sensor via waveguiding through the visor.

11. The system of claim 10, further comprising a shroud around the light sensor and lens, the shroud being opaque to wavelengths emitted by the light source, the shroud preventing light from the light source from being transmitted to the light sensor by reflection off of the visor.

12. The system of claim 11, further comprising a gasket at an interface between the shroud and the light sensor, the gasket being opaque to wavelengths emitted by the light source, the gasket further preventing light from the light source from being transmitted to the light sensor by reflection off of the visor.

13. The system of claim 10, wherein the surface of the visor in which the grooves are formed is a surface of the visor to which the light source is adjacent.

14. The system of claim 10, wherein the surface of the visor in which the grooves are formed is a surface of the visor opposite to a surface to which the light source is adjacent.

15. The system of claim 10, wherein the grooves are formed partially through a thickness of the visor.

16. The system of claim 1, wherein the material is black paint with an index of refraction higher than an index of refraction of the visor.

17. A method of forming an imaging device for a head mounted display device, the head mounted display device comprising a visor, and the display device comprising a light source and light sensor positioned behind the visor when worn by a user, the method comprising:

(a) forming optical disrupting features on or in a surface of the visor at least partially encircling an area of the visor adjacent to the light sensor; and (b) applying a material, opaque to wavelengths emitted by the light source, to the optical disrupting features, the optical disrupting features and opaque material blocking light from the light source from entering the light sensor via waveguiding through the visor.

18. The method of claim 17, further comprising the steps of encircling the light sensor with a shroud and affixing the shroud to the visor using a gasket opaque to wavelengths emitted by the light source, the shroud and gasket preventing light from the light source from being transmitted to the light sensor by reflection off of the visor.

19. The method of claim 17, said step (a) of forming optical disrupting features comprising the step of forming a pattern of grooves into a surface of the visor.

20. The method of claim 19, said step of forming a pattern of grooves comprising the step of forming the pattern of grooves by one of raised walls in an injection mold for forming the visor, machining the grooves in the visor after the visor is formed, and lasing the grooves in the visor after the visor is formed.

* * * * *